United States Patent
Yu et al.

(10) Patent No.: US 12,049,336 B1
(45) Date of Patent: Jul. 30, 2024

(54) VACUUM-PACKED COCONUT, PREPARATION METHOD THEREOF, AND READY-TO-DRINK TRIMMED COCONUT

(71) Applicant: KINGO FRUITS CO., LTD., Taipei (TW)

(72) Inventors: Tao Yu, Shouguang (CN); Zi-Rui Liu, Taipei (TW)

(73) Assignee: Kingo Fruits Co., Ltd., Taipei (TW)

( * ) Notice: Subject to any disclaimer, the term of this patent is extended or adjusted under 35 U.S.C. 154(b) by 21 days.

(21) Appl. No.: 18/167,371

(22) Filed: Feb. 10, 2023

(51) Int. Cl.
*A23B 7/005* (2006.01)
*A23B 7/148* (2006.01)
*A23N 7/00* (2006.01)
*B65B 31/04* (2006.01)

(52) U.S. Cl.
CPC ............ B65B 31/04 (2013.01); *A23B 7/0056* (2013.01); *A23N 7/00* (2013.01)

(58) Field of Classification Search
CPC ............ A23B 7/00; A23B 7/005; A23B 7/148
See application file for complete search history.

(56) References Cited

U.S. PATENT DOCUMENTS

| | | | | |
|---|---|---|---|---|
| 1,612,087 A | * | 12/1926 | Zucker | A23L 25/30 |
| | | | | 426/399 |
| 2,338,184 A | * | 1/1944 | Kaufman | A23L 25/30 |
| | | | | 426/617 |
| 2,783,152 A | * | 2/1957 | De Maya | A23L 25/30 |
| | | | | 426/617 |
| 2,973,272 A | * | 2/1961 | Winston | A23L 25/30 |
| | | | | 426/267 |
| 10,278,415 B2 | * | 5/2019 | dePoo | A23N 1/00 |
| 11,185,102 B2 | * | 11/2021 | DePoo | A23L 2/04 |
| 2004/0071846 A1 | * | 4/2004 | de la Mora y de la Mora | A23B 7/015 |
| | | | | 426/524 |
| 2017/0354171 A1 | * | 12/2017 | Wattanaporn | B65B 55/02 |
| 2020/0346414 A1 | * | 11/2020 | Orchard | B65B 7/164 |
| 2021/0084919 A1 | * | 3/2021 | Kline | A23B 7/0441 |
| 2023/0356369 A1 | * | 11/2023 | Li | B25D 11/10 |

FOREIGN PATENT DOCUMENTS

CN 1057946 A * 1/1992

* cited by examiner

*Primary Examiner* — Thomas M Wittenschlaeger
*Assistant Examiner* — David G Shutty
(74) *Attorney, Agent, or Firm* — Withrow + Terranova, PLLC; Vincent K. Gustafson

(57) ABSTRACT

The present invention relates to a vacuum-packed coconut, a preparation method thereof and a ready-to-drink trimmed coconut. The preparation method comprises the following steps: removing a shell of a fresh coconut to obtain a peeled coconut; letting the peeled coconut stand-still at room temperature for at least 10 hours to obtain a still-stood coconut; heating the still-stood coconut with a fluid at a temperature from 70 to 110° C. for 15 minutes to 40 minutes to obtain a fluid-heated coconut; and putting the fluid-heated coconut into a packing bag and then vacuuming the packing bag to obtain a vacuum-packed coconut. The advantages of the present invention include no air-pollution, stable quality, hygiene and prolonged storage period of the coconut products while maintaining the rich flavor of traditional roasted coconut.

17 Claims, 5 Drawing Sheets

VACUUM-PACKED COCONUT, PREPARATION METHOD THEREOF, AND READY-TO-DRINK TRIMMED COCONUT

BACKGROUND OF THE INVENTION

1. Field of the Invention

The present invention relates to a food and its preparation method, especially to a preparation method for processing fresh coconuts into vacuum-packed coconuts and the resulting vacuum-packed coconuts.

2. Description of the Prior Arts

A coconut is a fruit with a hard shell and people usually drink the coconut water inside the shell. The coconut water straight from fresh coconuts is a popular drink, but in traditional Thai cuisine, people may roast the fresh coconut first to give a roasted coconut, and then drink the coconut water from the roasted coconut.

The traditional way to prepare the roasted coconut is as follows: firstly digging a pit on the ground and putting fresh coconuts into the pit; secondly covering the fresh coconuts with firewood to roast the fresh coconuts for 1 to 2 hours; and finally, removing the shell of the roasted coconut, cutting an opening on the roasted coconut, and inserting a straw into the roasted coconut to drink the coconut water inside. The roasting process improves the flavor of the coconut water and provides the roasted coconut with richer taste than the fresh coconut. However, the roasting process has the following shortcomings:

First, burning of the firewood creates air pollution.

Second, it is difficult to control heat and burning time of the burning firewood, resulting in roasted coconuts each with a different flavor, and therefore the quality of traditional roasted coconut is unstable.

Third, the traditional roasted coconuts are mostly offered as a street food, so coconut water in the roasted coconuts may spoil or is prone to contamination due to poor food processing and hygiene conditions.

Therefore, it is necessary to improve the current method of coconut processing.

SUMMARY OF THE INVENTION

To overcome the aforementioned shortcomings, the present invention provides a vacuum-packed coconut and a preparation method thereof, and a ready-to-drink trimmed coconut to mitigate or obviate the aforementioned problems while maintaining the flavor of the roasted coconuts.

To achieve the aforementioned purpose, the present invention provides a preparation method of a vacuum-packed coconut comprising steps as follows:
  step (A): removing a shell of a fresh coconut to obtain a peeled coconut;
  step (B): letting the peeled coconut stand-still at room temperature for at least 10 hours to obtain a still-stood coconut;
  step (C): heating the still-stood coconut with a fluid at a temperature from 70° C. to 110° C. for 15 minutes to 40 minutes to obtain a fluid-heated coconut; and
  step (D): putting the fluid-heated coconut into a packing bag and then vacuuming the packing bag to obtain a vacuum-packed coconut.

According to the present invention, the room temperature is 15° C. to 30° C.

According to the present invention, fluid-heating refers to heating in hot water or heating with a high-temperature steam.

Preferably, in the step (C) of the aforementioned method, heating the still-stood coconut is conducted with hot water at a temperature from 70° C. to 90° ° C. for 20 minutes to 40 minutes to obtain the fluid-heated coconut.

Preferably, in the step (C) of the aforementioned method, heating the still-stood coconut is conducted with a steam at a temperature from 100° C. to 110° C. for 15 minutes to 25 minutes to obtain the fluid-heated coconut.

Preferably, the step (D) of the aforementioned method is step (D'): drying the fluid-heated coconut to obtain a dried coconut and putting the dried coconut into a packing bag, and then vacuuming the packing bag to obtain a vacuum-packed coconut.

Preferably, the step (D) of the aforementioned method is step (D"): drying the fluid-heated coconut to obtain a dried coconut and putting the dried coconut into a packing bag, and then vacuuming the packing bag followed by sterilizing to obtain a vacuum-packed coconut.

Preferably, the step (B) of the aforementioned method is step (B'): size-sorting the peeled coconut to obtain the sorted coconut, followed by letting the sorted coconut stand-still at room temperature for at least 10 hours to obtain a still-stood coconut, wherein the size-sorting selects the peeled coconut with a circumference of 30 cm to 34 cm.

Preferably, the step (B) of the aforementioned method is step (B"): ripeness-sorting the peeled coconut to obtain the sorted coconut, followed by letting the sorted coconut stand-still at room temperature for at least 10 hours to obtain a still-stood coconut, wherein the ripeness-sorting selects the peeled coconut without top-browning by naked-eyes observation and the one without sunken feeling after finger-pressing.

Preferably, the step (B) of the aforementioned method further comprises driving an air flow around the peeled coconut.

Preferably, the step (B) of the aforementioned method comprises letting the peeled coconut stand-still at room temperature for 13 hours to 15 hours to obtain a still-stood coconut.

Preferably, the step (C) of the aforementioned method comprises heating the still-stood coconut with a hot water at a temperature from 75° C. to 85° C. for 25 minutes to 35 minutes to obtain the fluid-heated coconut.

To achieve the aforementioned purpose, the present invention further provides a ready-to-drink trimmed coconut, which is prepared by the following method:
  step (A): removing a shell of a fresh coconut to obtain a peeled coconut;
  step (B): letting the peeled coconut stand-still at room temperature for at least 10 hours to obtain a still-stood coconut; and
  step (C): heating the still-stood coconut with a fluid at a temperature from 70° C. to 110° C. for 15 minutes to 40 minutes to obtain a ready-to-drink trimmed coconut.

To achieve the aforementioned purpose, the present invention further provides a vacuum-packed coconut, which comprises:
  a fluid-heated coconut, wherein the fluid-heated coconut is prepared by removing a shell of a fresh coconut to obtain a peeled coconut, letting the peeled coconut stand-still at room temperature for at least 10 hours to obtain a still-stood coconut, then heating the still-stood coconut with a fluid at a temperature from 70° C. to 110° C. for 15 minutes to 40 minutes; and a packaging bag, which vacuum-packages the fluid-heated coconut.

The advantages of the present invention are as follows:

First, the traditional firewood roasting for coconuts is substituted by the combination steps of peeling, still-standing and fluid-heating, so that the flavor of coconut water can be the same as the traditional roasted coconut without causing air pollution. Specifically, the step of peeling enhances air-exposure of the coconut flesh (i.e. the white pulp directly containing the coconut water) and promotes the oxidation and maturation of the coconut flesh. With proper oxidation and maturation by peeling and still-standing, plus the immersing of the aroma of coconut flesh into the coconut water in the step of fluid-heating, the flavor of coconut water is significantly improved.

Second, because the coconut is heated by fluid-heating, the heating extent for the coconut with the fluid is easy to control, so a stable quality can be provided. Specifically, in comparison of burning firewood, which only heats partially the coconut at a higher temperature generated by combustion, the temperature of the fluid is lower, but it is easier to be evenly distributed around the coconut. Therefore, it is easier to control the heating extent of the coconut by fluid-heating.

Third, the vacuum-packed coconut of the present invention is processed by the steps of peeling, fluid-heating at a temperature at 70° C. or higher, and vacuum-packaging. All these steps give the effects of cleaning, sterilization, and inhibition of the growth of bacteria. Therefore, contamination or deterioration of coconut water can be avoided.

Fourth, the roasted coconuts processed by the current skill lack the protection of coconut shells, so that the coconut water inside deteriorates quickly and cannot be sold abroad by sea freight. Besides, the weight of roasted coconut is too high and it is too expensive to ship by air. As a result, the roasted coconuts can only be sold in the country of origin and it is difficult to export the roasted coconuts overseas. The vacuum-packed coconut of the present invention remains sterile by vacuum-packaging after heat sterilization, which greatly prolongs the storage period of coconut, and so the vacuum-packed coconuts can be exported overseas via sea freight, so that flexibility of selling coconuts is greatly increased.

DETAILED DESCRIPTION OF THE PREFERRED EMBODIMENTS

Preparation Example 1 Preparation of the Vacuum-Packed Coconut of Example 1

Figure 1:
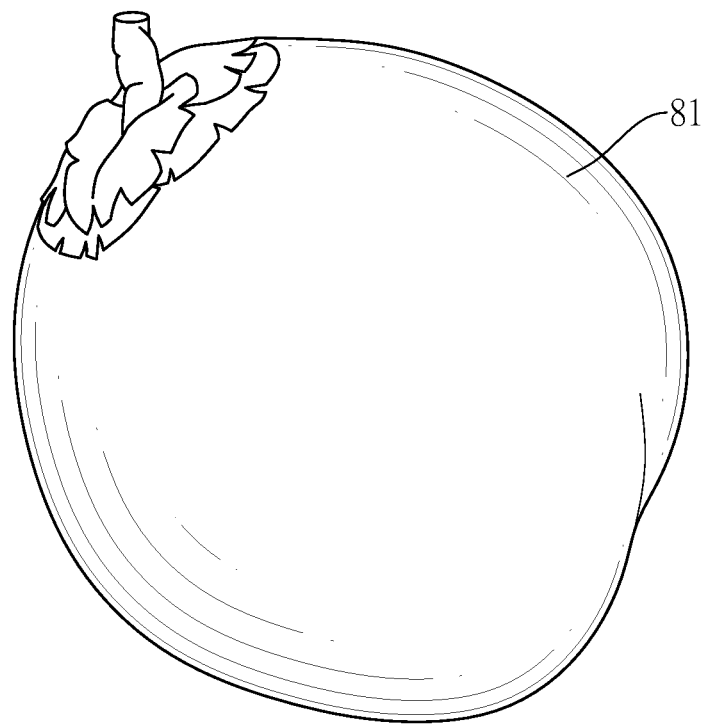
FIG. 1 is a schematic diagram of a fresh coconut.
Figure 2:
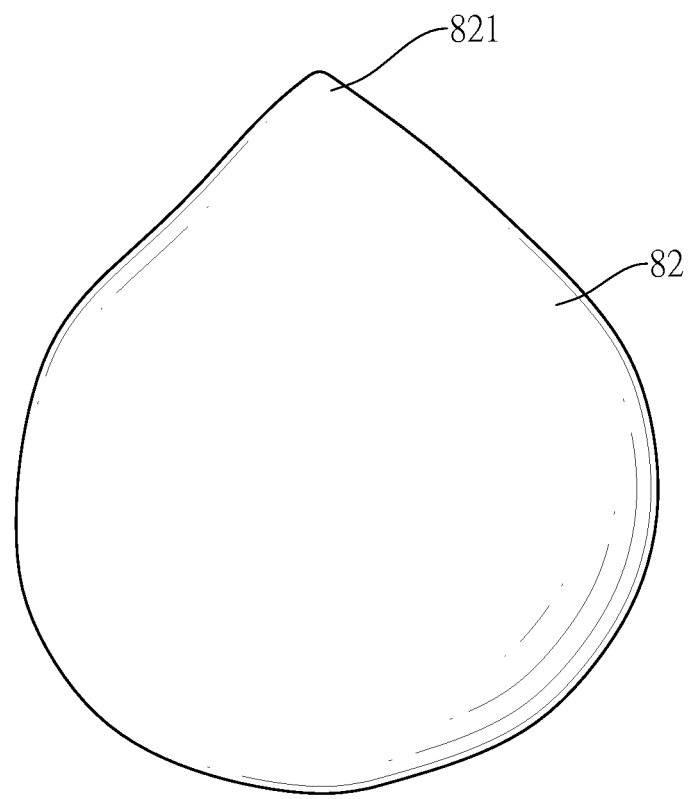
FIG. 2 is a schematic diagram of a peeled coconut.
Figure 5:
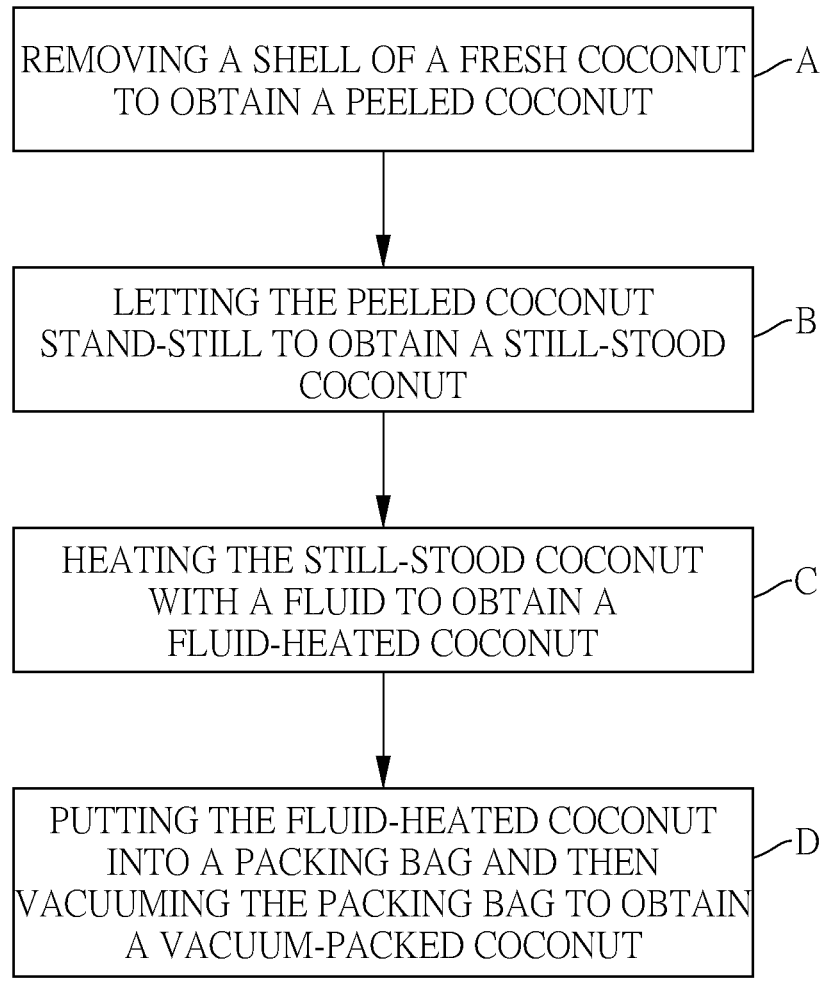
FIG. 5 is a flow chart of the preparation method of a vacuum-packed coconut of the present invention.

As shown in FIG. 5, the preparation method of the vacuum-packed coconut of the present invention comprises steps as follows:

As shown in FIG. 1, FIG. 2 and FIG. 5, firstly, in step (A), a shell is removed from a fresh coconut 81 and a peeled coconut 82 is obtained (FIG. 1). Specifically, the skin of the fresh coconut 81 comprises an exocarp (i.e. the green layer), a mesocarp (i.e. the fibrous husk) and an endocarp (i.e. the hard woody layer). In this step, the exocarp is removed from the fresh coconut 81, the mesocarp were polished, so that a peeled coconut 82 is obtained. The peeled coconut 82 is commonly called trimmed coconut. Meanwhile, a tip part 821 constituted by tissue skin remains on the top of the peeled coconut 82, and coconut eyes are covered by the aforementioned tip part 821. The purpose of peeling is to enhance the air-exposure of coconut flesh (i.e. the white pulp directly containing the coconut water) and promotes the oxidation and maturation of the coconut flesh.

Then, the coconuts eyes are exposed by removing the excess tissue skin, so a peeled coconut with open eyes is obtained. This is convenient for opening the coconut eyes directly by a driller subsequently for drinking coconut water.

In step (B), the peeled coconut with open eyes is screened by size-sorting and ripeness-sorting, and then is left under room temperature for more than 10 hours to obtain a still-stood coconut 83, wherein the size-sorting selects the peeled coconut 82 with a circumference of 30 cm to 34 cm and the ripeness-sorting selects the peeled coconut 82 with proper ripeness by naked-eye observation and finger tactile impression. Specifically, the ripeness of the peeled coconut 82 is decided as good or proper when the top part of the peeled coconut 82 is not turning brown determined by the naked-eye observation, and the surface of the peeled coconut 82 does not feel soft when fingers press lightly thereon. On the other hand, if the peeled coconut 82 is browning on the top or its hard wood layer can be slightly pressed down, it should be determined as an overripe.

After size-sorting and ripeness-sorting, the peeled coconut with open eyes was left under room temperature for 14 hours to obtain the still-stood coconut 83. Through the step of still-standing, there will be enough time for the peeled coconut with open eyes to oxidize and mature, so as to enhance the flavor. Besides, the air inside of the peeled coconut with open eyes can be released during still-standing in order to reduce the inner pressure. If the time of still-standing is less than 10 hours, then the oxidization and maturation would be not enough, so that the flavor will be too light. In addition, the peeled coconut with open eyes will explode easily in the subsequent heating process and causes loss because of too much air in it. It is preferably to use a fan or other device to drive the air to flow around the peeled coconut with eyes-exposure. Some of the peeled coconut with open eyes will crack during the process of still-standing due to the pressure accumulated inside. Therefore, the still-stood coconut 83 with cracks should be discarded to avoid more loss in the coconut processing.

Figure 3:
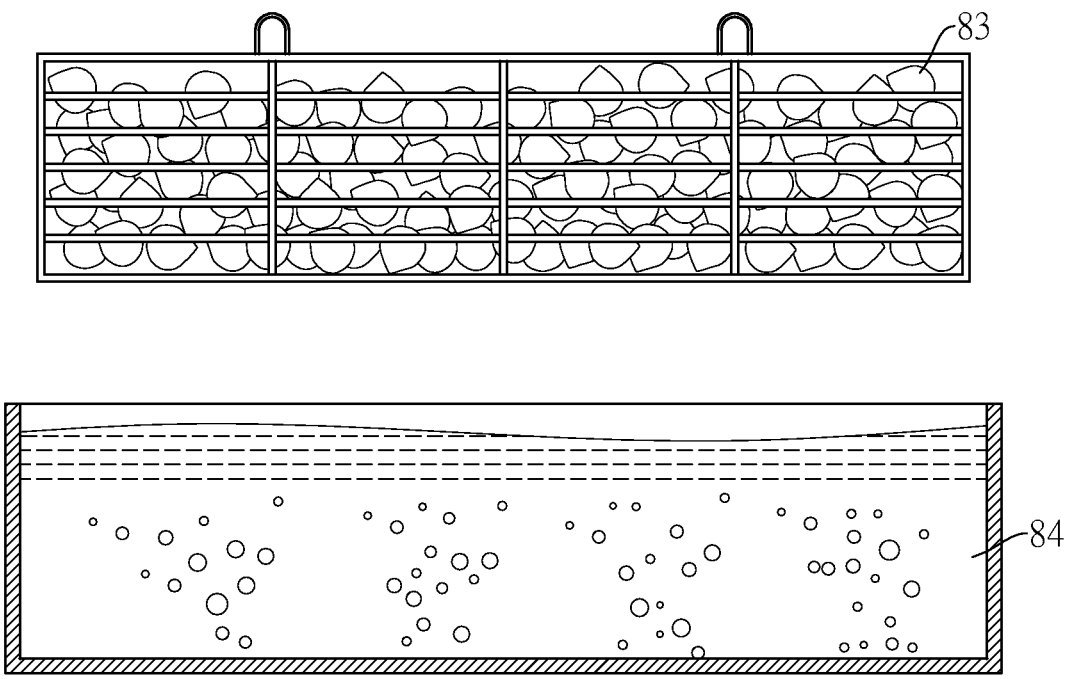
FIG. 3 is a schematic diagram of equipment for fluid-heating of the present invention.

In step (C), as shown in FIG. 3, the still-stood coconut 83 is heated with a fluid at a temperature from 70° C. to 110° ° C. for 15 minutes to 40 minutes, so that a fluid-heated coconut 86 is obtained. The aroma of the coconut flesh is released and immerses into the coconut water during the process of fluid-heating, so that the coconut water will be rich of flavor. Fluid-heating refers to heating in hot water or heating with a high-temperature steam. Specifically, in the present preparation example, the still-stood coconut 83 is heated in a 80° C. hot water 84 for 30 minutes to obtain a fluid-heated coconut 86. But the means of fluid-heating is not limited thereto. In other preferred embodiment, the still-stood coconut 83 is heated with a 100° C. to 110° C. steam for 15 minutes to 25 minutes to obtain a fluid-heated coconut 86, which is the ready-to-drink trimmed coconut of the present invention.

In the step of the aforementioned fluid-heating, the heating time of hot water 84 heating is preferable for 20 minutes to 40 minutes to properly immerse the aroma of coconut flesh into the coconut water, so that a rich and balanced flavor can be obtained. If the fluid-heating is conducted with a steam, then the heating time is preferably from 15 minutes to 25 minutes, so the same great flavor can be obtained.

In step (D"), the fluid-heated coconut 86 is dried and put into a packing bag 87, and the packing bag 87 is vacuumed and sterilized to obtain a vacuum-packed coconut. Specifically, the fluid-heated coconut 86 is dried by the flowing air that surrounds the fluid-heated coconut 86, the flowing air is driven by a fan or other device, so that the moisture attached on the peeled coconut can evaporate rapidly and a dried coconut can be obtained. Then, the dried coconut is put into a packaging bag 87 followed by vacuuming and heat-sterilizing at a temperature of 80° C. for 10 minutes, so that the packaging bag 87 itself is also sterilized and a vacuum-packed coconut 85 of Example 1 is obtained. The storage period of vacuum-packed coconut 85 is prolonged due to vacuum-packaging and heat-sterilization again, so that the vacuum-packed coconut 85 can be exported overseas via sea freight.

Figure 4:
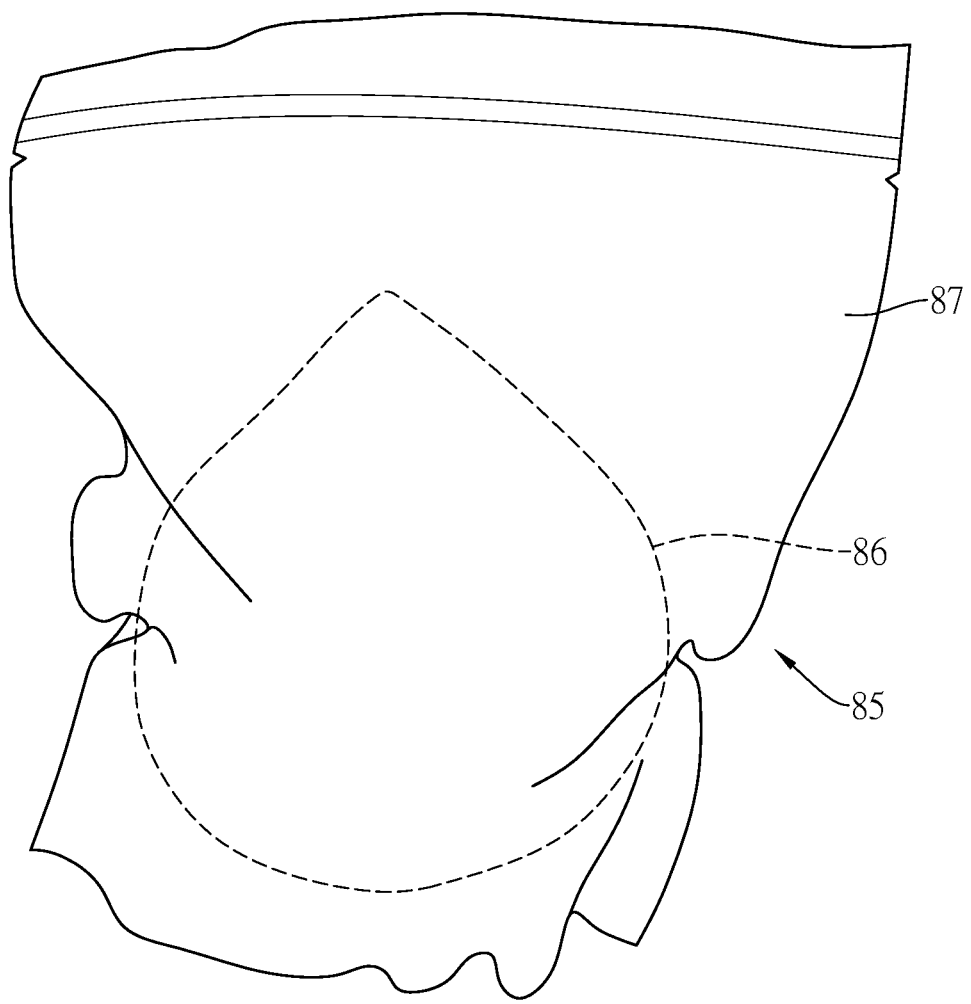
FIG. 4 is a schematic diagram of the vacuum-packed coconut prepared by the preparation method of the vacuum-packed coconut of the present invention.

In another preferred embodiment, if the hygiene condition of the preparation environment is better, for example under an aseptic condition, the sterilization in step (D") can be omitted: The dried coconut is put into a packaging bag 87 followed by vacuuming. That is, the fluid-heated coconut is vacuum-packed after drying to obtain the vacuum-packed coconut. In another embodiment, the drying in step (D") can be further omitted. That is, the fluid-heated coconut 86 is put into a packaging bag 87 followed by vacuuming to obtain a vacuum-packed coconut 85, as shown in FIG. 4.

Example 2

The preparation method of Example 2 is similar to Example 1; the difference is that the fluid-heating in step (C) is conducted with a 75° C. hot water for 30 minutes.

Example 3

The preparation method of Example 3 is similar to Example 1; the difference is that the fluid-heating in step (C) is conducted with a 85° C. hot water for 30 minutes.

Example 4

The preparation method of Example 4 is similar to Example 1; the difference is that the fluid-heating in step (C) is conducted with a 70° C. hot water for 30 minutes.

Example 5

The preparation method of Example 5 is similar to Example 1; the difference is that the fluid-heating in step (C) is conducted with a 90° C. hot water for 30 minutes.

Example 6

The preparation method of Example 6 is similar to Example 1; the difference is that the fluid-heating in step (C) is conducted with a 100° C. steam for 20 minutes.

Comparative Example 1

The preparation method of Comparative Example 1 is similar to Example 1; the difference is that the fluid-heating in step (C) is conducted with a 65° C. hot water for 30 minutes.

Comparative Example 2

The preparation method of Comparative Example 2 is similar to Example 1; the difference is that the fluid-heating in step (C) is conducted with a 100° C. hot water for 30 minutes.

Comparative Example 3

The preparation method of Comparative Example 2 is similar to Example 1; the difference is that the fluid-heating in step (C) is conducted with a 120° C. steam for 30 minutes.

Test 1 Sensory Evaluation

The sensory evaluation was conducted by several professional taste-experts drinking the coconut water from Examples 1 to 6 and Comparative Examples 1 to 3. And the results of the sensory evaluation were recorded as shown in the following Table 1.

TABLE 1

The sensory evaluation results of Examples 1 to 6 and Comparative Examples 1 to 3.

|  | Example 1 | Example 2 | Example 3 | Example 4 | Example 5 |
|---|---|---|---|---|---|
| sensory evaluation results | O | O | O | Δ1 | Δ2 |

|  | Example 6 | Comparative Example 1 | Comparative Example 2 | Comparative Example 3 |
|---|---|---|---|---|
| sensory evaluation results | O | X1 | X2 | X2 |

O: Excellent flavor and rich of aroma
Δ1: The flavor is slightly lighter but acceptable.
Δ2: The acidity is slightly higher but acceptable.
X1: The flavor is too light and similar to a fresh coconut.
X2: The acidity is too high and willing not to drink again.

To sum up, the traditional firewood roasting for coconuts are substituted by the combination steps of peeling, still-standing and fluid-heating, so that the flavor of coconut water can be the same as the traditional roasted coconut without causing air pollution. Specifically, the step of peeling enhances air-exposure of the coconut flesh (i.e. the white pulp directly containing the coconut water) and promotes the oxidation and maturation of the coconut flesh. With proper oxidation and maturation by peeling and still-standing, plus the immersing of the aroma of coconut flesh into the coconut water in the step of fluid-heating, the flavor of coconut water is significantly improved.

Besides, because the coconut is heated by fluid-heating, the heating extent for the coconut by the fluid is easy to control, so a stable quality can be provided. Specifically, in comparison of burning firewood, which only heats partially the coconut with a higher temperature generated by combustion, the temperature of the fluid is lower, but it is easier to be evenly distributed around the coconut. Therefore, it is easier to control the heating extent of the coconut by fluid-heating.

In addition, the vacuum-packed coconut of the present invention is processed by the steps of peeling, fluid-heating at a temperature at 70° C. or higher, and vacuum-packaging. All these steps give the effects of cleaning, sterilization, and inhibition of the growth of bacteria. Therefore, contamination or deterioration of coconut water can be avoided.

Lastly, the vacuum-packed coconut of the present invention remains sterile by vacuum-packaging after heat sterilization, which greatly prolongs the storage period of coconut, so the vacuum-packed coconuts can be exported overseas via sea freight, and flexibility of coconuts selling is greatly increased.

The above embodiments are only preferred embodiments of the present invention, not intended to limit the present invention in any aspect. It is apparent to those skilled in the art that various modifications and variations can be made without departing from the scope and spirit of the invention. Although the present invention has been described in terms of specific preferred embodiments, it should be understood that the invention should not be unduly limited to those specific embodiments. In fact, the various modifications that are obvious to those of ordinary skill in the art are also encompassed within the scope of the following claims.

The invention claimed is:

1. A preparation method of a vacuum-packed coconut comprising the following steps:
   step (A): removing a shell of a fresh coconut to obtain a peeled coconut;
   step (B): letting the peeled coconut stand-still at room temperature for at least 10 hours to obtain a still-stood coconut;
   step (C): heating the still-stood coconut with a fluid at a temperature from 70° C. to 110° C. for 15 minutes to 40 minutes to obtain a fluid-heated coconut; and
   step (D): putting the fluid-heated coconut into a packing bag and then vacuuming the packing bag to obtain a vacuum-packed coconut.

2. The preparation method of a vacuum-packed coconut as claimed in claim 1, wherein the step (C) is heating the still-stood coconut with hot water at a temperature from 70° ° C. to 90° C. for 20 minutes to 40 minutes to obtain the fluid-heated coconut.

3. The preparation method of a vacuum-packed coconut as claimed in claim 2, wherein the step (D) is step (D'): drying the fluid-heated coconut to obtain a dried coconut and putting the dried coconut into a packing bag, and then vacuuming the packing bag to obtain a vacuum-packed coconut.

4. The preparation method of a vacuum-packed coconut as claimed in claim 2, wherein the step (D) is step (D"): drying the fluid-heated coconut to obtain a dried coconut and putting the dried coconut into a packing bag, and then vacuuming the packing bag followed by sterilizing to obtain a vacuum-packed coconut.

5. The preparation method of a vacuum-packed coconut as claimed in claim 2, wherein the step (B) is step (B'): size-sorting the peeled coconut to obtain a sorted coconut, followed by letting the sorted coconut stand-still at room temperature for at least 10 hours to obtain a still-stood coconut, wherein the size-sorting selects the peeled coconut with a circumference of 30 cm to 34 cm.

6. The preparation method of a vacuum-packed coconut as claimed in claim 2, wherein the step (B) further comprises: driving an air flow around the peeled coconut.

7. The preparation method of a vacuum-packed coconut as claimed in claim 1, wherein the step (C) is heating the still-stood coconut with a steam at a temperature from 100° C. to 110° C. for 15 minutes to 25 minutes to obtain the fluid-heated coconut.

8. The preparation method of a vacuum-packed coconut as claimed in claim 7, wherein the step (D) is step (D'): drying the fluid-heated coconut to obtain a dried coconut and putting the dried coconut into a packing bag, and then vacuuming the packing bag to obtain a vacuum-packed coconut.

9. The preparation method of a vacuum-packed coconut as claimed in claim 7, wherein the step (D) is step (D"): drying the fluid-heated coconut to obtain a dried coconut and putting the dried coconut into a packing bag, and then vacuuming the packing bag followed by sterilizing to obtain a vacuum-packed coconut.

10. The preparation method of a vacuum-packed coconut as claimed in claim 7, wherein the step (B) is step (B'): size-sorting the peeled coconut to obtain a sorted coconut, followed by letting the sorted coconut stand-still at room temperature for at least 10 hours to obtain a still-stood coconut, wherein the size-sorting selects the peeled coconut with a circumference of 30 cm to 34 cm.

11. The preparation method of a vacuum-packed coconut as claimed in claim 7, wherein the step (B) further comprises: driving an air flow around the peeled coconut.

12. The preparation method of a vacuum-packed coconut as claimed in claim 1, wherein the step (D) is step (D'): drying the fluid-heated coconut to obtain a dried coconut and putting the dried coconut into a packing bag, and then vacuuming the packing bag to obtain a vacuum-packed coconut.

13. The preparation method of a vacuum-packed coconut as claimed in claim 1, wherein the step (D) is step (D"): drying the fluid-heated coconut to obtain a dried coconut and putting the dried coconut into a packing bag, and then vacuuming the packing bag followed by sterilizing to obtain a vacuum-packed coconut.

14. The preparation method of a vacuum-packed coconut as claimed in claim 1, wherein the step (B) is step (B'): size-sorting the peeled coconut to obtain a sorted coconut, followed by letting the sorted coconut stand-still at room temperature for at least 10 hours to obtain a still-stood coconut, wherein the size-sorting selects the peeled coconut with a circumference of 30 cm to 34 cm.

15. The preparation method of a vacuum-packed coconut as claimed in claim 1, wherein the step (B) further comprises: driving an air flow around the peeled coconut.

16. A ready-to-drink trimmed coconut, which is prepared by the following method:
   step (A): removing a shell of a fresh coconut to obtain a peeled coconut;
   step (B): letting the peeled coconut stand-still at room temperature for at least 10 hours to obtain a still-stood coconut; and
   step (C): heating the still-stood coconut with a fluid at a temperature from 70° C. to 110° C. for 15 minutes to 40 minutes to obtain the ready-to-drink trimmed coconut.

17. A vacuum-packed coconut comprising:
   a fluid-heated coconut, wherein the fluid-heated coconut is prepared by removing a shell of a fresh coconut to obtain a peeled coconut, letting the peeled coconut stand-still at room temperature for at least 10 hours to obtain a still-stood coconut, then heating the still-stood coconut with a fluid at a temperature from 70° C. to 110° C. for 15 minutes to 40 minutes; and a packaging bag, which vacuum-packages the fluid-heated coconut.

* * * * *